(12) United States Patent
Lin

(10) Patent No.: US 6,178,013 B1
(45) Date of Patent: Jan. 23, 2001

(54) IMAGE PICK-UP MODULE TRANSMISSION ARRANGEMENT FOR A SCANNER

(75) Inventor: Jim Lin, Hsinchu Hsien (TW)

(73) Assignee: Compeye Corp., Hsinchu Hsien (TW)

( * ) Notice: Under 35 U.S.C. 154(b), the term of this patent shall be extended for 0 days.

(21) Appl. No.: 09/135,430

(22) Filed: Aug. 17, 1998

(51) Int. Cl.[7] .................................................. H04W 1/04
(52) U.S. Cl. ......................... 358/474; 358/296; 358/409; 358/411; 358/505
(58) Field of Search .......................... 399/211; 358/474, 358/296, 409, 411, 505; 382/312

(56) References Cited

U.S. PATENT DOCUMENTS

| | | | | |
|---|---|---|---|---|
| 4,779,141 | * | 10/1988 | Wantanabe | 358/286 |
| 5,311,015 | * | 5/1994 | Takeuchi | 250/234 |
| 5,610,720 | * | 3/1997 | Fujioka et al. | 358/296 |
| 5,717,503 | * | 2/1998 | Chien | 358/475 |
| 5,845,180 | * | 12/1998 | Tsai | 399/211 |

* cited by examiner

Primary Examiner—Jerome Grant, II
Assistant Examiner—Kevin Kianni
(74) Attorney, Agent, or Firm—Rosenberg, Klein & Lee

(57) ABSTRACT

An image pick-up module transmission arrangement includes a top cover holding a transparent glass above a scanning path defined therein and two racks along two opposite sides of the scanning path, two guide rails bilaterally fixedly fastened to the top cover at a bottom side of the scanning path, an image pick-up module reciprocated in the scanning path along the guide rails, the image pick-up module having pulleys revolvably supported on the guide rails and spring leaves disposed in contact with the guide rails, and a transmission shaft mounted in the image pick-up module, the transmission shaft having two gear wheels at two opposite ends meshed with the racks, the gear wheels being rotated clockwise/counter-clockwise by a power drive in the image pick-up module, causing the image pick-up module to be reciprocated in the scanning path along the guide rails.

2 Claims, 4 Drawing Sheets

IMAGE PICK-UP MODULE TRANSMISSION ARRANGEMENT FOR A SCANNER

BACKGROUND OF THE INVENTION

The present invention relates to a scanner, and more specifically to an image pick-up module transmission arrangement for a scanner which enables the image pick-up module to be stably smoothly reciprocated in the scanning path to positively pick up the image of document up.

Scanners have been intensively used with computers in offices for text and graphic document data input. A regular scanner for this purpose is generally comprised of a transparent glass, an image pick-up module, a transmission mechanism, an electronic control circuit, a power supply unit, and a machine base. During the operation of a scanner, the light path must be maintained stable so that the image of document can be positively picked up by the image pick-up module. If the light path is not maintained stable, image distortion becomes inevitable. To a high resolution scanner of CIS (contact image sensor) type scanner, the requirement for a stable light path is critical.

FIG. 1 shows an image pick-up module transmission arrangement for a scanner according to the prior art. According to this arrangement, the image pick-up module is driven to move back and forth in the scanning path by a motor drive through a belt transmission mechanism. Because the belt transmission mechanism produces vibration when the motor drive is started, the reciprocating motion of the image pick-up module which is unstable may affect the scanning quality. Furthermore, because the belt transmission mechanism is mounted in the machine base, the outer shell of the scanner tends to be put out of shape due to change of ambient temperature and humility. When the outer shell of the scanner is deformed, the light path becomes unstable, in consequence the scanning quality is affected.

SUMMARY OF THE INVENTION

The present invention has been accomplished to provide an image pick-up transmission module which eliminates the aforesaid problems. According to the present invention, the top cover of the scanner holds a transparent glass above the scanning path and two racks along two opposite sides of the scanning path, the image pick-up module is supported on two guide rails, which are bilaterally fixedly fastened to the top cover at the bottom of the scanning path, and a transmission shaft is revolvably mounted in the image pick-up module, and coupled to the racks by gear wheels. The gear wheels are rotated clockwise/counter-clockwise by a power drive in the image pick-up module, causing the image pick-up module to be reciprocated in the scanning path along the guide rails. Because the top cover of the scanner is stretched by the transparent glass, ambient temperature and humility changes do not deform the top cover easily. Furthermore, because the image pick-up module is reciprocated in the scanning path by means of rotating the gear wheels along the racks, the reciprocating motion of the image pick-up module is stable, and little noise or vibration is produced during the reciprocating motion of the image pick-up module.

DETAILED DESCRIPTION OF THE PREFERRED EMBODIMENT

Figure 1:
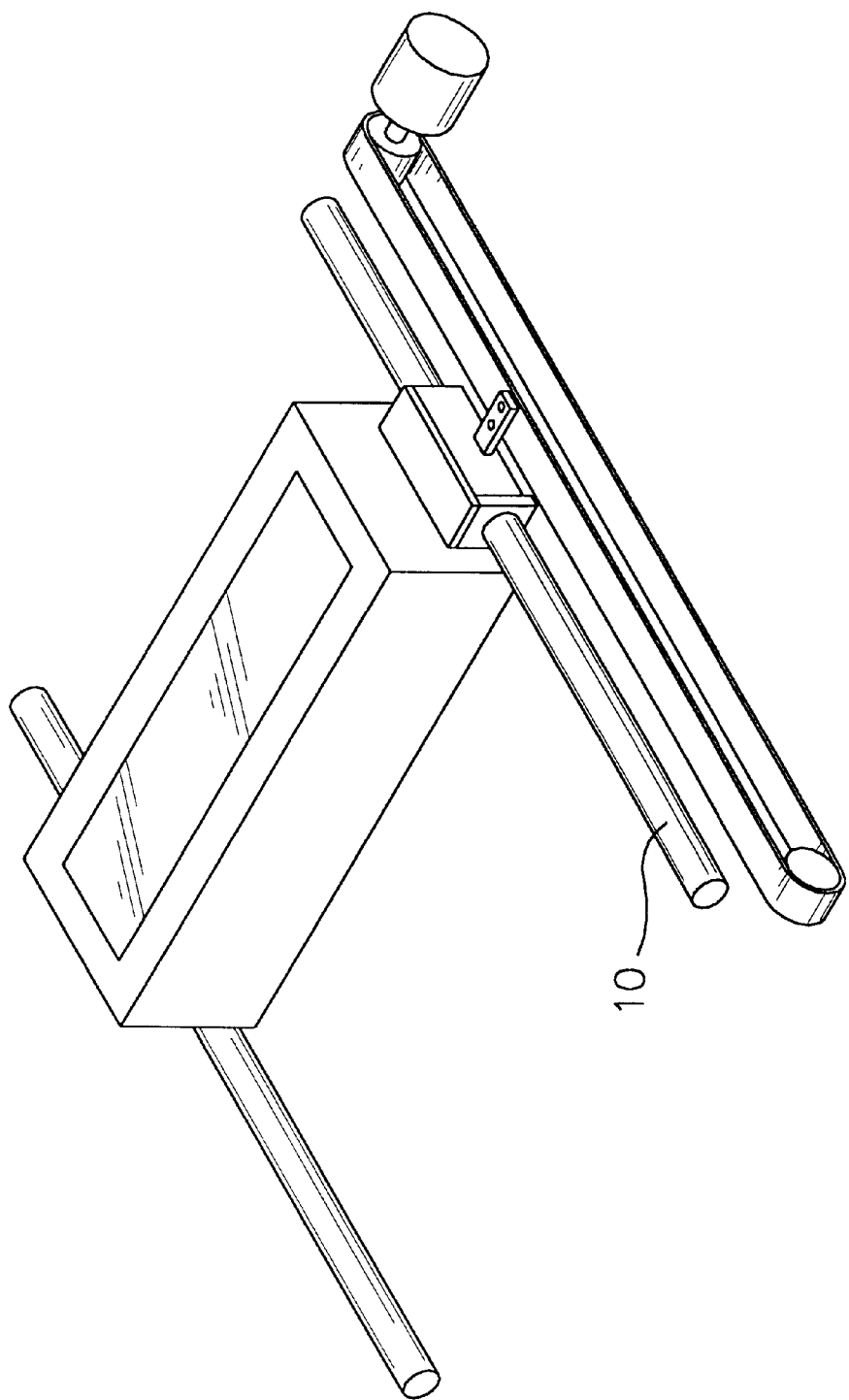
FIG. 1 is a perspective view showing an image pick-up module transmission arrangement for a scanner according to the prior art.
Figure 2:
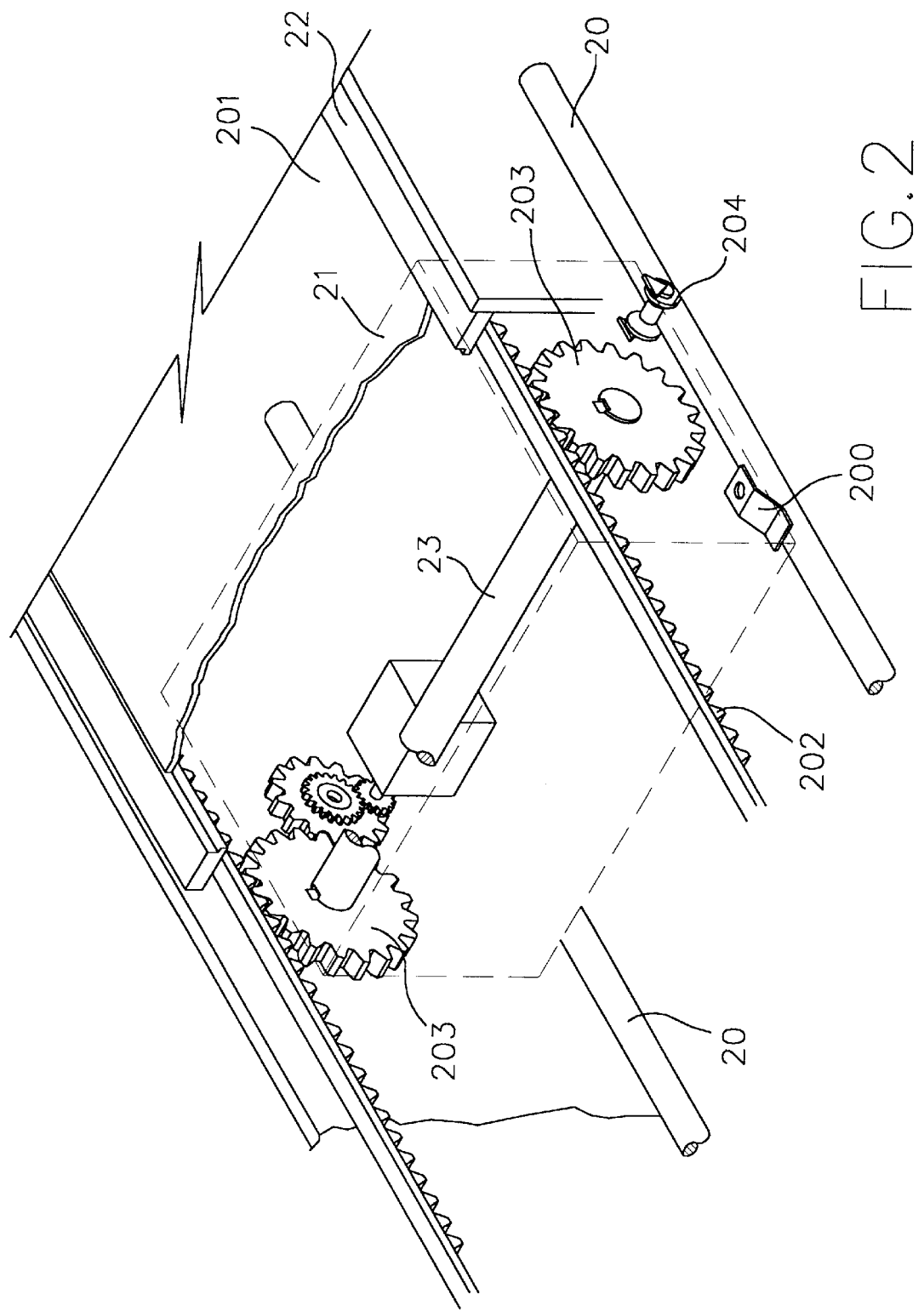
FIG. 2 is a perspective view of the present invention.

Referring to FIG. 2, the present invention comprises generally at least one for example two guide rails 20, an image pick-up module 21, a transmission shaft 23, a transparent glass 201, and a top cover 22.

Figure 3:
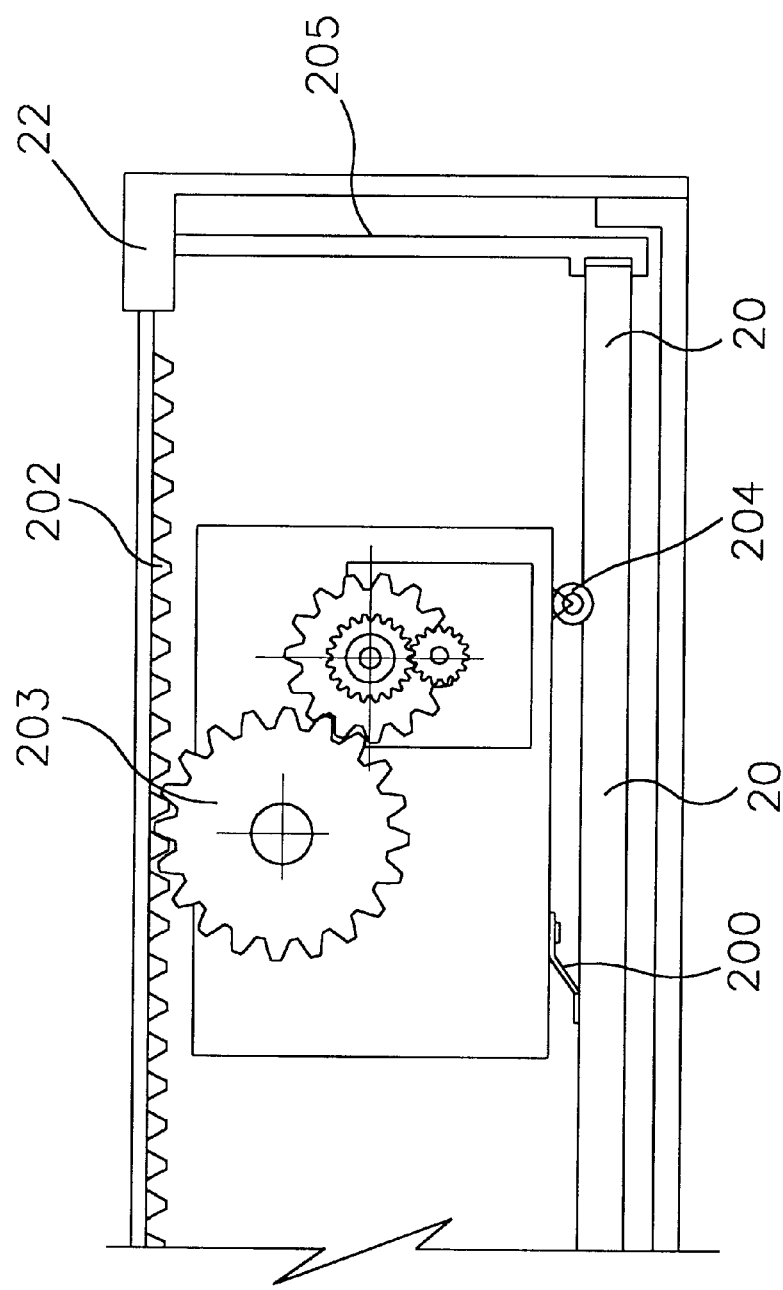
FIG. 3 is a side view in section of the present invention.
Figure 4:
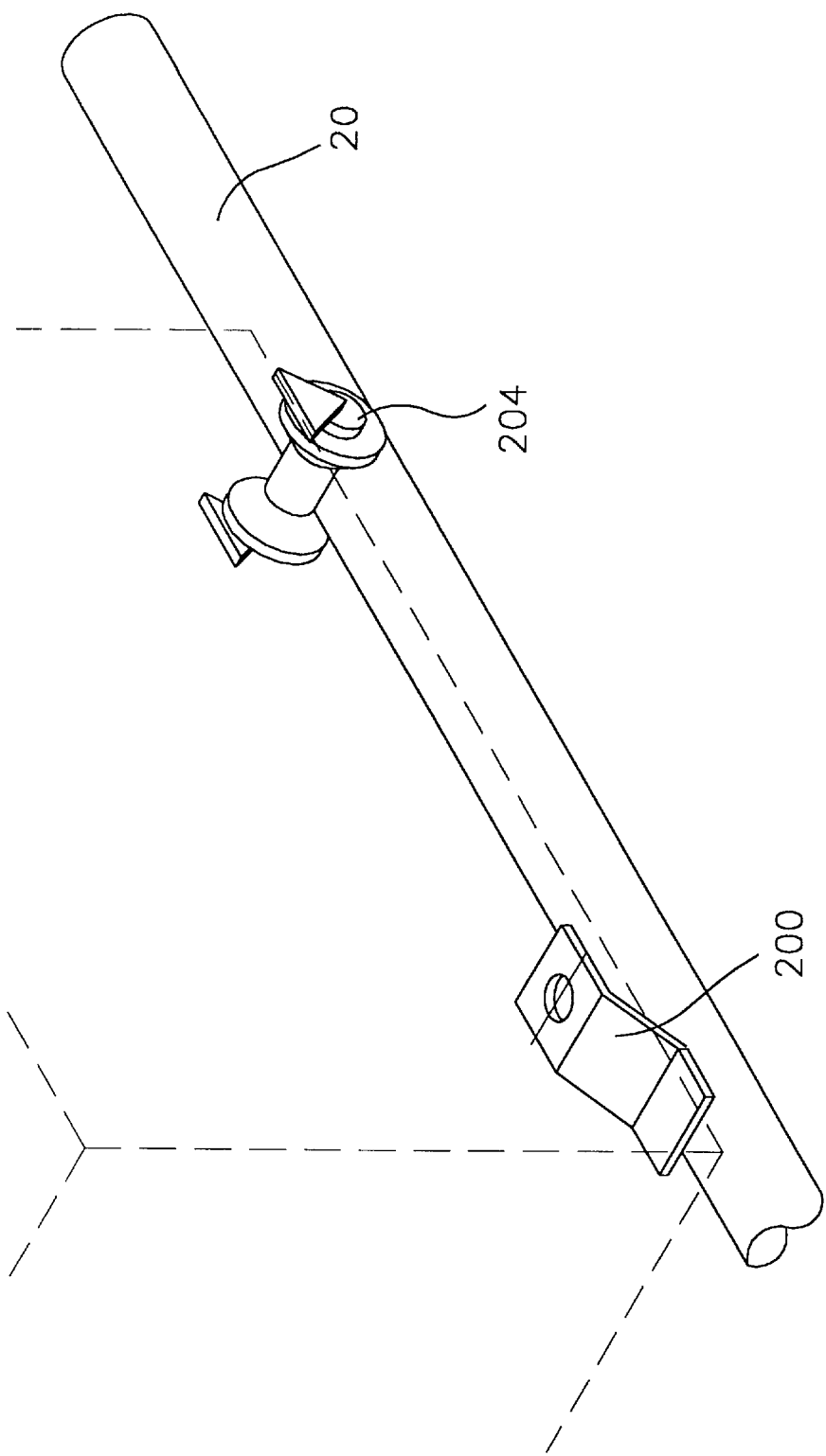
FIG. 4 is an enlarged view of a part of the present invention, showing the spring leaf supported on the guide rail.

The transparent glass 201 is a flat glass plate integral with the top cover 22. The top cover 22 comprises two racks 202 arranged in parallel along two opposite lateral sides of the scanning path. The guide rails 20 are arranged in parallel along the two lateral sides of the scanning path below the racks 202. The image pick-up module 21 comprises an optical scanning system and a power drive. The transmission shaft 23 is mounted in the image pick-up module 21, having two opposite ends respectively extended out of two opposite lateral sides of the image pick-up module 21. Two driven gear wheels 203 are respectively mounted on the ends of the transmission shaft 23 outside the image pick-up module 21. The driven gear wheels 203 are respectively meshed with the racks 202, and rotated by the power drive in the image pick-up module 21. When the driven gear wheels 203 are rotated, the image pick-up module 21 is forced to move between the racks 202 and the guide rails 20 along the scanning path. Because the driven gear wheels 203 are fixedly mounted on the two opposite ends of the transmission shaft 23, they are synchronously rotated or stopped. As an alternate form of the present invention friction wheels may be used instead of the driven gear wheels 203. In this case, tracks are used instead of the racks 202 to match with the friction wheels. The guide rails 20 bear the image pick-up module 21 and guide its reciprocating motion. Two pulleys 204 are respectively provided at the two opposite lateral sides of the image pick-up module 21, and revolvably supported on the guide rails 20, enabling the image pick-up module 21 to be smoothly stably moved along the guide rails 20 (In the drawings, only one pulley 204 is shown). Two holder frames 205 are fixedly transversely fastened to the top cover 22 at two opposite ends of the scanning path to hold the guide rails 20 in place (in FIG. 3, only one holder frame 205 is shown), enabling the distance between the guide rails 20 and the transparent glass 201 of the top cover 22 to be maintained and unchanged. Because the cover panel of the top cover is formed of the transparent glass 201, the structural strength of the top cover 22 is sufficient to support the whole transmission mechanism, and the top cover 22 does not deform easily due to a change of ambient temperature.

In order to eliminate vibration and noise between the driven gear wheels 203 and the racks 202 during the operation of the scanner, spring leaves 200 are provided at the bottom side wall of the image pick-up module 21 and respectively disposed in contact with the guide rails 20 at the top (in the drawings, only one spring leaf 200 is shown).

While only one embodiment of the present invention has been shown and described, it will be understood that various modifications and changes could be made thereunto without departing from the spirit and scope of the invention disclosed.

What the invention claimed is:

1. An image pick-up module transmission arrangement comprising:

a top cover defining a scanning path, said top cover including two racks longitudinally arranged in parallel respectively along two opposing lateral sides of said scanning path;

a transparent glass plate integral with said top cover above said scanning path;

at least one guide rail fixedly fastened to said top cover and spaced therefrom, said at least one guide rail extending longitudinally and parallel to said scanning path;

an image pick-up module displaceably supported on said at least one guide rail and reciprocated along said scanning path on said at least one guide rail, said image pick-up module including (a) at least one pulley pivotally coupled thereto and rollably mounted on said at least one guide rail, and (b) at least one spring leaf longitudinally displaced from said at least one pulley and mounted to a lower surface of said image pick-up module, said spring leaf having a distal end portion disposed in sliding contact with said at least one guide rail, said image pick-up module having an optical scanning system and a power drive mounted therein; and a transmission shaft mounted in said image pick-up module, said transmission shaft having two opposite ends respectively extending out from two opposite lateral sides of said image pick-up module, said transmission shaft having two driven gear wheels respectively fixedly mounted on two opposite ends thereof and respectively meshingly engaged with said two racks, said driven gear wheels being rotated clockwise/counter-clockwise by said power drive of said image pick-up module for causing said image pick-up module to be reciprocated along said scanning path.

2. An image pick-up module transmission arrangement comprising:

a top cover defining a scanning path, said top cover including two tracks longitudinally arranged in parallel respectively along two opposing lateral sides of said scanning path;

a transparent glass plate integral with said top cover above said scanning path;

at least one guide rail fixedly fastened to said top cover and spaced therefrom, said at least one guide rail extending longitudinally and parallel to said scanning path;

an image pick-up module displaceably supported on said at least one guide rail and reciprocated along said scanning path on said at least one guide rail, said image pick-up module including (a) at least one pulley pivotally coupled thereto and rollably mounted on said at least one guide rail, and (b) at least one spring leaf longitudinally displaced from said at least one pulley and mounted to a lower surface of said image pick-up module, said spring leaf having a distal end portion disposed in sliding contact with said at least one guide rail, said image pick-up module having an optical scanning system and a power drive mounted therein; and a transmission shaft mounted in said image pick-up module, said transmission shaft having two opposite ends respectively extending out from two opposite lateral sides of said image pick-up module, said transmission shaft having two friction wheels respectively fixedly mounted on two opposite ends thereof and respectively disposed in contact with said two tracks, said friction wheels being rotated clockwise/counter-clockwise by said power drive of said image pick-up module for causing said image pick-up module to be reciprocated along said scanning path.

\* \* \* \* \*